March 29, 1932.     M. PRÜSS     1,851,684
CLARIFICATION PLANT
Filed Jan. 24, 1929     2 Sheets-Sheet 2
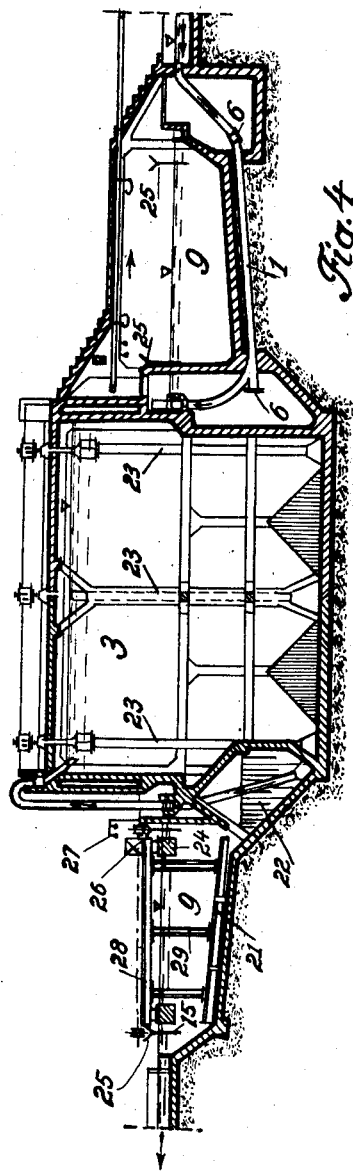
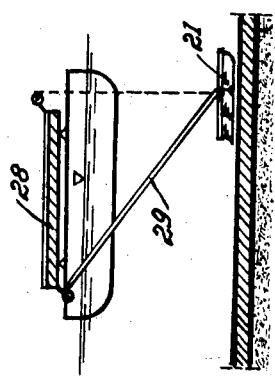
INVENTOR.
M. PRÜSS.
By Fetherstonhaugh & Co.
ATTYS.

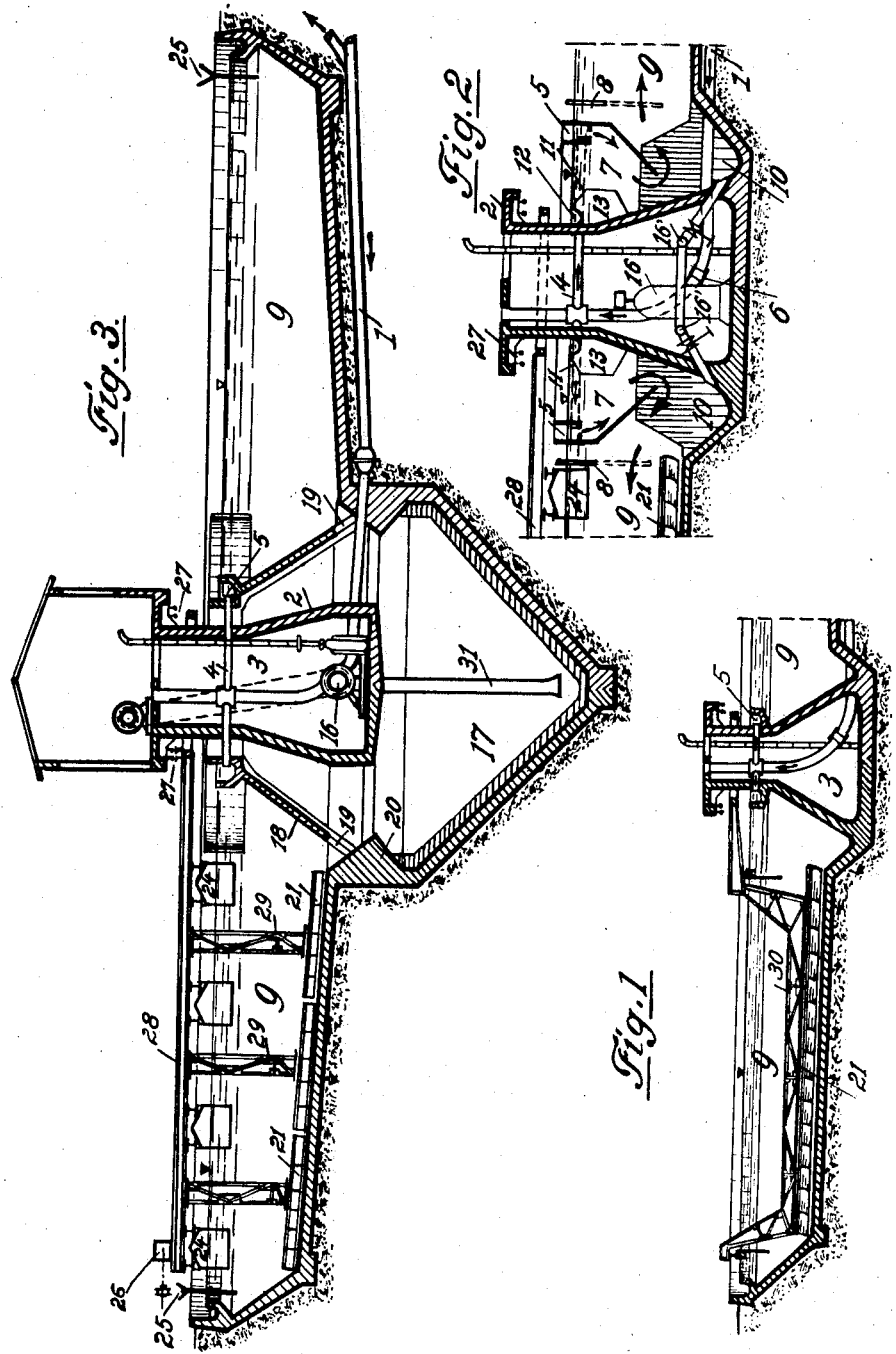

Patented Mar. 29, 1932

1,851,684

UNITED STATES PATENT OFFICE

MAX PRÜSS, OF ESSEN, GERMANY

CLARIFICATION PLANT

REISSUED

Application filed January 24, 1929, Serial No. 334,806, and in Germany January 25, 1928.

The invention relates to clarification plants and has in particular reference to the settling tanks thereof and to the means for removing the mud from the liquid treated.

There are different constructions of apparatus serving to remove the mud from flat circular or square settling tanks by means of scrapers which rotate on the floor of the tank and shift the mud toward the center. These constructions have the common characteristic feature that the scraper arms are carried and in most cases are driven by a vertical shaft arranged in the center of the settling tank. This supporting and rotating shaft of the scraper arms either is mounted on a fixed bridge extending over the whole tank or with plants having settling tanks of very large dimensions, the scraper arms are further supported at the periphery of the tank and in most cases are then driven also on the periphery. In this case the above-mentioned central vertical shaft is replaced by a small central pillar whereon the central bearing of the scraper arms is mounted and which sometimes has mounted on it an operating bridge or gangway that carries the supply pipe for the waste water to be treated. In all these cases the mud is shifted by the scrapers towards said central vertical shaft or pillar and drawn off from there through a leading-off pipe. With small plants in many cases a small pit is arranged below this central shaft, which pit serves to thicken the mud scraped in this manner prior to its being drawn off from the floor of the pit.

According to the present invention a chamber is provided in the central portion of the settling tank below the water level, which chamber is utilized to lodge the stationary part of the apparatus of the plant, the scrapers rotating round this chamber.

This central chamber, for example, may serve to lodge the mud pump and be surrounded by an oil separator. It may further constitute a collecting chamber for the fresh mud or be used as rotting room.

The arrangement of such a dry chamber in the central portion of the settling tank affords, for example, the advantage that the waste water feeding pipe can be arranged below the settling tank so as to form a dip pipe, and rise within this dry chamber. This arrangement permits the saving of pressure height, if the feeding pipe line outside the tank is situated above the water level in the latter. When constituting a low mud rotting room, this central chamber affords the advantage, for example in comparison with the so-called Imhoff tanks, the settling tank of which is also immediately connected to the rotting room situated below it, that the present settling tank with its scrapers which supply the fresh mud to the rotting room, may have any desired large dimensions, whilst the floor of the settling tank of the Imhoff plant is inclined, from which inclined floor the mud is fed to the fresh mud collecting chamber merely by gravity, so that in this case the dimensions of the settling tank depend upon the slope angle required with respect to its area.

Finally, the use of the central chamber as a separate rotting room affords the advantage that this room is maintained warm by the surrounding settling tank, whereby the rotting process is helped.

As, in the present invention the scraper arms are no longer supported by a central shaft, that is at one point, but must be supported further at the periphery of the tank, the scrapers would not uniformly co-operate with the floor of the tank if their arms be rigidly connected to the supporting bridge, in case the side walls and the floor of tank happen to settle. The invention therefore makes provision for arranging the individual scrapers, or groups thereof, of the series of scrapers on the supporting bridge so as to be vertically shiftable. The simplest design that fulfills these conditions consists in suspending the scrapers from a bridge that is floating in the settling tank.

In order to allow of my invention to be more easily understood, some preferred embodiments of same are diagrammatically illustrated by way of example in the drawings which accompany and form part of this specification. In these drawings Figure 1 is a fragmentary sectional view of a settling tank of simplest construction, Figure 2 is a similar central fragmentary view of a tank the said central chamber of which is utilized to lodge the mud pump and is surrounded by an oil separator, Figure 3 is a sectional view of a tank having a low central collecting chamber serving to collect the fresh mud or as rotting room, Figure 4 is a fragmentary view of a tank having a separate rotting room, and Figure 5 is a detail showing means for supporting the scrapers.

Referring first to Figure 1, the settling tank denoted by 9 may have circular or square shape and has in its central portion a chamber 3 that extends downwardly below the water level. 21 denotes the scrapers that rotate about this chamber and thereby shift toward the center of the tank, or in other words toward chamber 3 the mud settling in the tank. In the embodiment illustrated in Figure 1, the scrapers in known manner are suspended from a bridge 30 which in its turn is supported both on the outer periphery of chamber 3 and on that of the tank 9.

As already indicated hereinbefore, the chamber 3 may be utilized for different purposes.

In the embodiment illustrated in Figure 2, the dip pipe 1 that supplies the waste water to be clarified is introduced in the chamber 3 which is covered at least in part, this dip pipe being situated below the settling tank 9 and accessible within the dry chamber 3. Radial pipes 4 branching off from the dip pipe 1 distribute the waste water into a circular distributing trough 5 arranged in the tank 9.

The chamber 3 is surrounded by a cylinder 7 that tapers in downward direction and is connected to the distributing trough 5, as shown. The waste water leaving the trough 5 is forced to flow through cylinder 7 and circular distributing gratings 8 prior to entering the proper settling room 9 through which it flows in radial direction.

Below the cylinder 7 is provided a mud collecting trough 10 which likewise surrounds chamber 3 and serves to collect the heavy mud particles that settle first, whilst the particles that are lighter than the water and suspended therein, such as oil particles, rise within the cylinder 7 to the surface and can be removed by hand over an inclined flange 11 into a trough 12 connected thereto. Furthermore, on oil separator 13 of any suitable design is lodged within the cylinder 7 by which the oil skimmed off is further separated from the water that has been taken thereinto. The mud settling in tank 9 is shifted by the scrapers 21 rotating therein likewise into the mud collecting trough 10. A pump 16 lodged in chamber 3 sucks the mud off from trough 10 through pipes 16' and forces it away through a pressure pipe (not shown) which may be located for example beside the dip pipe 1. If the settled mud cannot be pumped, it may be removed by means of any suitable grab crane (not shown) mounted on the wall 2 of chamber 3 and by means of mud cars (likewise not shown) which may be supplied and drawn off on any suitable bridge leading to the chamber 3 above the water level.

The described plant is well suited, among other purposes, to treat waste waters that in addition to oil and fine-grained mud contain coarse and heavy precipitates which cannot be shifted by scrapers, such as oily waste waters containing heavy tar flocks that adhere to the scrapers or heavy iron sinter from rolling mills and the like. While hitherto waste water of this nature has had to be freed from oil and heavy precipitates in special clarifying apparatus, the present clarification plant comprising the described oil separator allows of any kinds of mud being separated simultaneously. Both the suspended particles and the heaviest ones which settle quickly remain in the central trough 10 from where they can be removed in the simplest and suitable manner.

The tank illustrated in Figure 3 is suited for example to treat domestic waste water containing putrescent sludge that tends after a short time to rise in the water. With the plants hitherto known, sludge of this nature has to be removed continually which is undesirable on account of the difficulty of depositing it and requires special intermediate sludge tanks. In the settling plant illustrated in Figure 3 the central portion of the proper settling tank 9 forms a mud collecting chamber 17 of such dimensions that it is capable of receiving and thickening, according to requirements, the supplied mud quantity of one to three days. A circular cap 18 separates the chamber 17 from the settling room 9 proper but for a lower circular connecting gap 19. On its upper edge the chamber 17 has an inwardly extending bead 20 by which as in the Imhoff tank mud cakes rising in chamber 17 are prevented from returning into the settling room 9. These cakes on the contrary rise to the surface between the cap 18 and the wall 2 of chamber 3, give off their gases and sink down again. The mud chamber 17 may be made so large that sufficient time is afforded for the mud to rot partly or completely. This construction would constitute a combination of an Imhoff tank with a large settling room fitted with scrapers.

When used to subsequently clarify waste water that has been purified by activiated sludge, the chamber 17 may further serve to subject the return sludge to an intermediate ventilation before it is supplied anew to the purifying tank.

As in the embodiment shown in Figure 2, the chamber 3 lodges the dip pipe 1 which rises therein and delivers again the waste water to be clarified through radial pipes 4 to the distributing trough 5. Chamber 3 further contains, as in the embodiment of Figure 2, the mud pump 16 which sucks the mud from the collecting chamber 17 through a suction pipe 31 and forces it away through a pressure pipe (not shown) located for example beside the dip pipe 1. Dampers 6, 6 provided on the dip pipe 1 and pressure pipe within a suitable inspecting pit on the periphery of the tank and near its center permit the cleaning of these two pipes and the removal therefrom of deposits of heavy precipitates that cannot be washed away after these pipes have been cut off and pumped out. With known plants such accessibility at the center of the tank is not attained, the waste water supply pipe with them must be conducted on a fixed bridge up to the center of the tank either above the water level, or at the level of the water. In this latter case the scraper arms must be permanently under water so that they cannot be controlled and attended to when the tank is full. All these drawbacks are avoided by keeping the center of the tank free from the scraper arms according to the present invention and utilizing it instead for the purposes set forth.

In the embodiment illustrated in Figure 4 the central chamber 3 is designed as a separate mud rotting chamber whereinto the fresh mud from fresh mud collecting pockets 22 surrounding chamber 3 is pumped over from time to time and wherein the mud is agitated periodically by mixing pumps 23. Owing to the rotting room 3 being surrounded by the settling chamber 9 which contains more or less warm water, the former is retained warm thereby, which is of importance to the rotting process.

As will be seen from Figures 3 and 4, the scrapers 21 rotating about the chamber 3 are subdivided in each series into groups and, as shown in Figure 5, suspended from the bridge or carrier 28 by inclined arms 29, so that they are adjustable in height. Owing to this arrangement the individual scraper groups are capable of adjusting themselves to the unevennesses of the tank floor due to the tank settling ununiformly, as frequently happens in mining districts. The described manner of fixing the scrapers affords the further advantage that they can be raised above the water level either individually or in unison, to inspect and attend to them.

The rotating bridge or carrier 28 of these embodiments may run on rails mounted on the central pillar formed by the chamber 3 and on the circumferential wall of the tank 9. It is however possible to design the bridge in a much lighter and cheaper manner by mounting it on bodies 24, as shown in Figures 2 to 4, floating on the liquid content of the tank 9. Due to the scrapers being suspended vertically movably from the bridge or carrier 28, variations of the water level in this case have no influence upon the reliability of their functioning.

The drive of the floating bridge or carrier 28 may be effected by means of a rope or chain 25 fixedly mounted on the periphery of the tank and wound round a corresponding pulley of an electrically driven winch 26 that is mounted on the bridge 28. Current is supplied to this winch preferably near the central chamber 3, for example through trolleys 27. Furthermore, the rope 25 may rotate itself and be driven by a belt drive, the bridge 28 being clamped on the rope. In the embodiment shown in Figure 4, the bridge 28 is driven by two ropes and two rope pulleys of different diameter.

The liquid to be treated, instead of flowing radially from the center of the tank toward its periphery, as illustrated in the figures, may flow also from one side of the tank to the opposite one. In this case the dip pipe may be dispensed with.

As to the embodiment illustrated in Figure 3, it is to be noted that the mud collecting chamber 17 may be of such a configuration that one end is located below the central chamber 3 whilst its other end extends underneath the tank 9 up to the periphery of the latter.

What I claim and desire to secure by Letters Patent, is:—

1. A settling plant comprising a settling tank, a water tight chamber extending down in the centre of said tank and separated from the walls thereof, said chamber being secured to the bottom of said tank, and scrapers adapted to rotate around said chamber on the floor of said tank and to shift the mud towards said chamber.

2. A settling plant comprising a settling tank, a water tight chamber extending down in the centre of said tank and separated from the walls thereof, said chamber being secured to the bottom of said tank, scrapers adapted to rotate around said chamber on the floor of said tank and to shift the mud towards said chamber, and a mud removing pump mounted in said water tight chamber.

3. A settling plant comprising a settling tank, scrapers adapted to rotate therein on its floor and to shift the settled mud toward its center, a stationary chamber extending down below the water level in the center of and separated from said tank, a waste water supply pipe conducted below said tank and rising in said chamber.

4. A settling plant comprising a settling tank, scrapers adapted to rotate therein on its floor and to shift the settled mud toward its center, a stationary chamber extending down below the water level in the center of and separated from said tank, a waste water supply pipe conducted below said tank and rising in said chamber, and a mud removing pump mounted in said chamber.

5. A settling plant comprising a settling tank, scrapers adapted to rotate therein on its floor and to shift the settled mud toward its center, a stationary chamber extending down below the water level in the center of and separated from said tank, a mud collecting chamber surrounding said stationary chamber, and passages leading from said tank to said mud collecting chamber and adapted to supply to the latter the mud fed by said scrapers.

6. A settling plant comprising a settling tank, scrapers adapted to rotate therein on its floor and to shift the settled mud toward its center, a stationary chamber extending down below the water level in the center of and separated from said tank, a cap surrounding said chamber to constitute a mud collecting chamber, and spaced from said tank to constitute a circular gap adapted to supply to said chamber the mud fed by said scrapers from said tank.

7. A settling plant comprising a settling tank, scrapers adapted to rotate therein on its floor and to shift the settled mud toward its center, a chamber arranged below the water level in the center of and separated from said tank and adapted to receive the mud fed by said scrapers from said tank, another chamber arranged below the water level of said tank in said first-named chamber and separated therefrom, and a mud removing pump mounted in said last-named chamber.

8. A settling plant comprising a settling tank, scrapers adapted to rotate therein on its floor and to shift the settled mud toward its center, a chamber arranged below the water level in the center of and separated from said tank and adapted to receive the mud fed by said scrapers from said tank, another chamber arranged below the water level of said tank in said first-named chamber and separated therefrom, a mud removing pump mounted in said last-named chamber, and a waste water supplying pipe conducted below said tank and rising in said last-named chamber.

9. A settling plant comprising a settling tank, a scraper carrier adapted to rotate above the water level in said tank, scrapers mounted on said carrier in series and adapted to shift the settled mud toward the center of said tank, means for vertically displacing them relatively to said carrier, and a chamber arranged below the water level in the center of and separated from said tank.

10. A settling plant comprising a settling tank, a scraper carrier adapted to rotate above the water level in said tank, scrapers mounted on said carrier in series and adapted to shift the settled mud toward the center of said tank, means for vertically displacing them relatively to said carrier, a stationary chamber arranged below the water level in the center of and separated from said tank, a mud collecting chamber surrounding the stationary chamber, and passages between said tank and mud collecting chamber adapted to supply to the latter the mud fed by said scrapers from said tank.

11. A settling plant comprising a settling tank, a scraper carrier adapted to rotate above the water level in said tank, scrapers mounted on said carrier in series and adapted to shift the settled mud toward the center of said tank, means for vertically displacing them relatively to said carrier, a chamber arranged below the water level in the center of and separated from said tank and adapted to receive the mud fed by said scrapers from said tank, another chamber arranged below the water level of said tank in said first-named chamber and separated therefrom, a mud removing pump mounted in said last-named chamber, and a waste water supplying pipe conducted below said tank and rising in said last-named chamber.

12. A settling plant comprising a settling tank, a scraper carrier adapted to rotate above the water level in said tank, scrapers vertically swingably connected to said carrier and adapted to shift the settled mud toward the center of said tank, and a chamber arranged below the water level in the center of and separated from said tank.

13. A settling plant comprising a settling tank, a scraper carrier floating on the water in said tank and adapted to rotate therein, scrapers vertically swingably mounted on said carrier and adapted to shift the settled mud toward the center of said tank, and a chamber arranged below the water level in the center of and separated from said tank.

14. A settling plant comprising a settling tank, a scraper carrier floating on the water in said tank and adapted to rotate therein, scrapers vertically swingably mounted on said carrier and adapted to shift the settled mud toward the center of said tank, a chamber arranged below the water level in the center of and separated from said tank and adapted to receive the mud fed by said scrapers, another chamber arranged below the water level in said tank in said first-named chamber and separated therefrom, a mud removing pump mounted in said last-named chamber, and a waste water supplying pipe conducted below said tank and extending upwardly in said last-named chamber.

In testimony whereof I affix my signature.

MAX PRÜSS.